Nov. 18, 1941.   E. H. PIRON   2,263,310
VEHICLE TRUCK
Filed Nov. 19, 1934   4 Sheets-Sheet 4
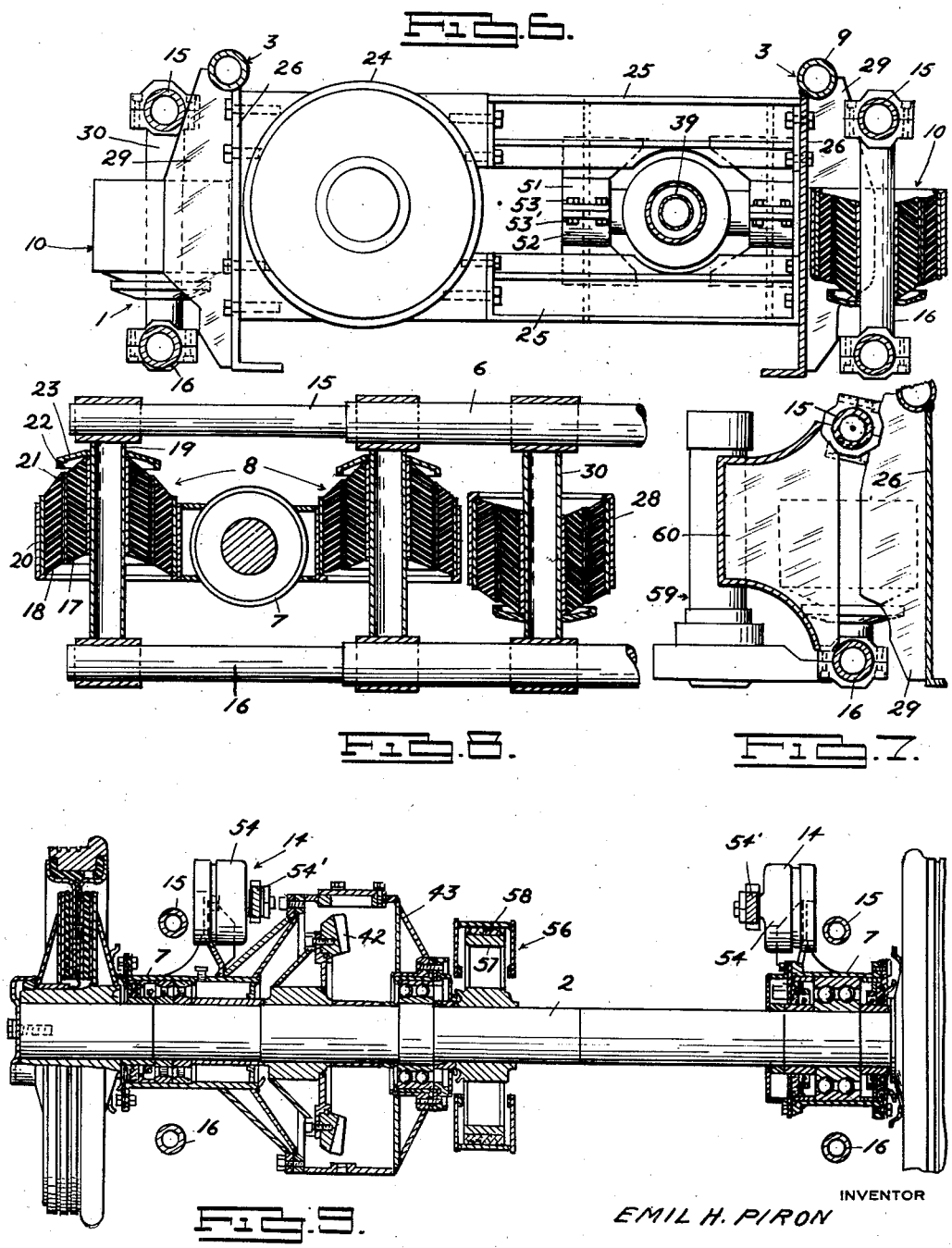
INVENTOR
EMIL H. PIRON
BY
Whittemore, Hulbert, Whittemore & Belknap
ATTORNEYS Patented Nov. 18, 1941

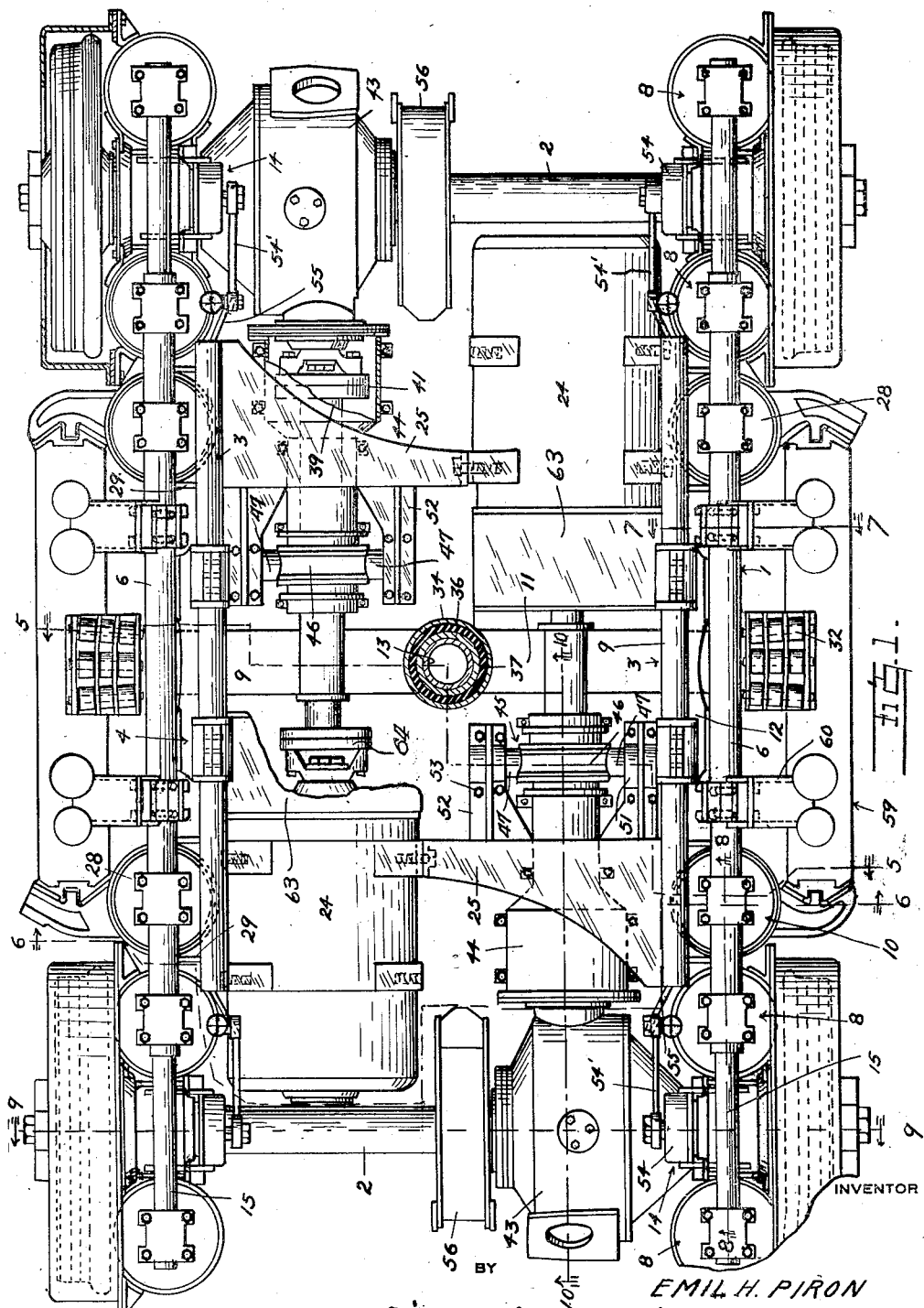

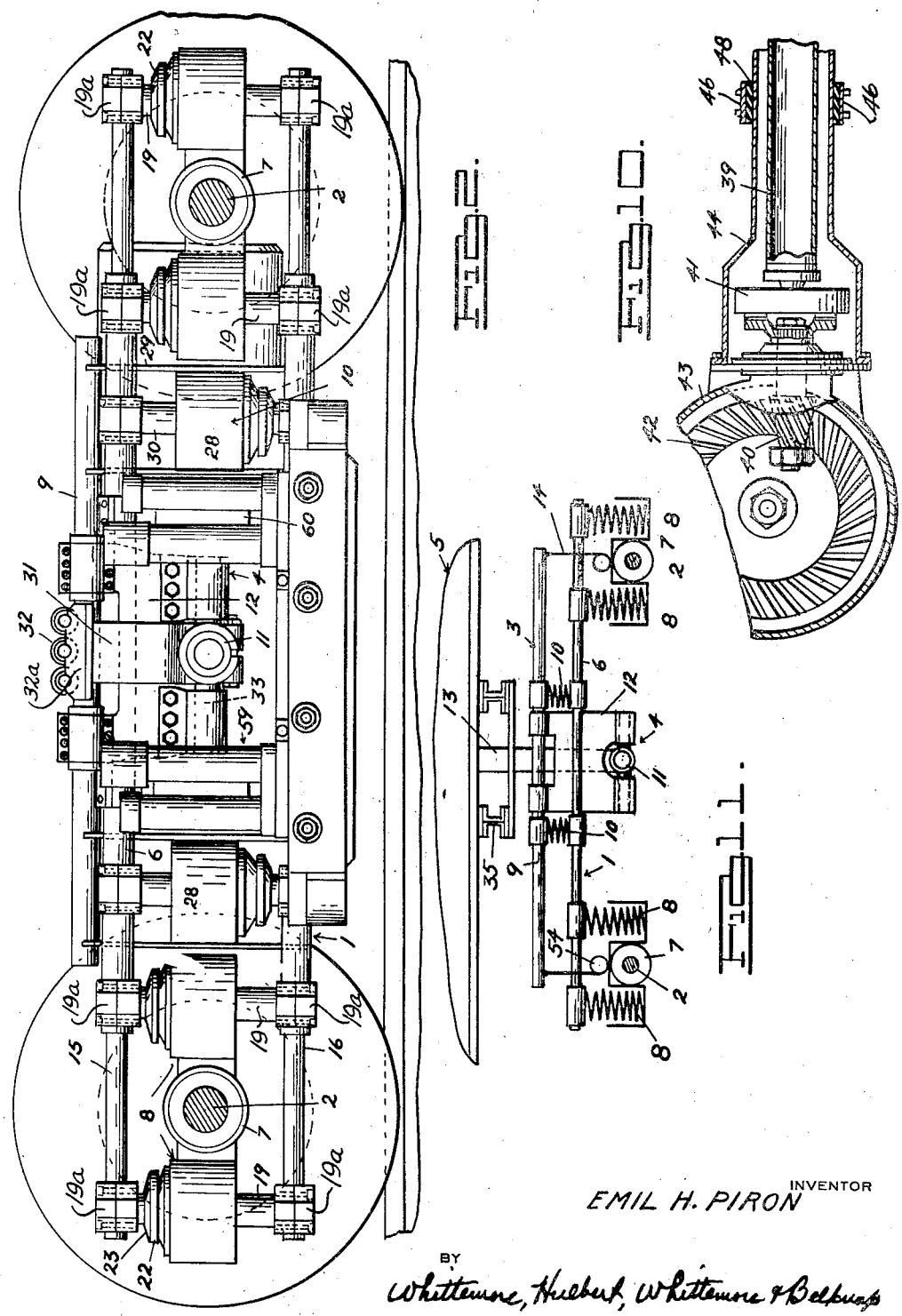

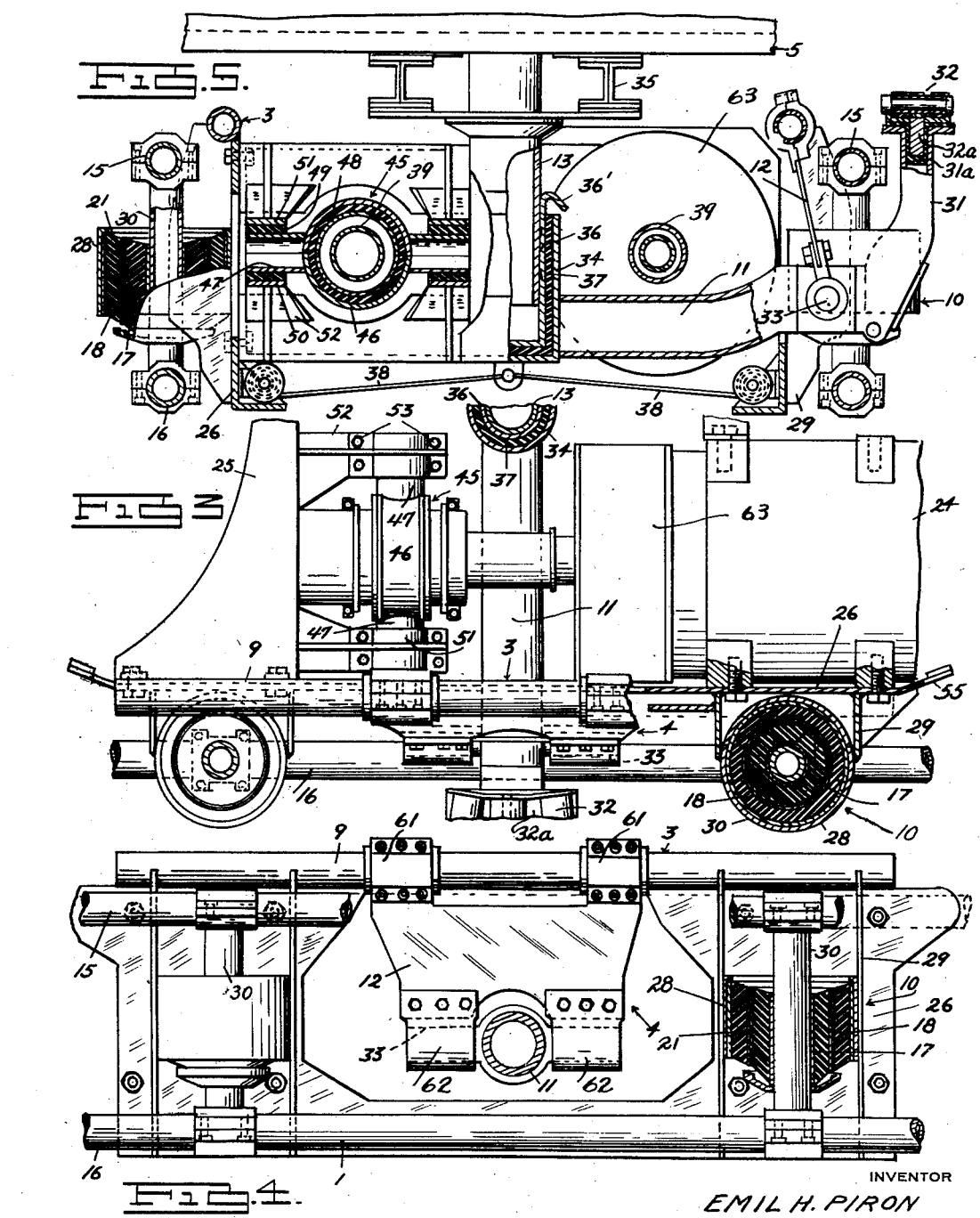

2,263,310

UNITED STATES PATENT OFFICE 2,263,310

VEHICLE TRUCK

Emil H. Piron, New York, N. Y., assignor, by mesne assignments, to Transit Research Corporation, New York, N. Y., a corporation of New York Application November 19, 1934, Serial No. 753,734

46 Claims. (Cl. 105—190)

This invention relates to trucks for rail vehicles and has for its object to provide a truck which will give greater riding comfort, which will be more quiet in operation, which will be of neat and compact appearance and which lends itself to low cost quantity production.

A main object of the invention is to provide an improved springing system by constructing the frame as two units, one of which is sprung from the other. In carrying this into effect, the main side girders include the journals and journal springs within their depth, as well as the springs from which the sub-frame is supported, the sub-frame having the motors as an integral part thereof. The swing link is also suspended from the sub-frame. In this manner the swing bolster is resiliently supported from the main girders and may follow the motions of a car body resting thereon without the necessity for any free rolling motion of the body with respect to the swing bolster.

Another object is to provide springs which will not only function in accord with desired load deflection ratios but which will act to dampen the transmission of both high and low frequency vibrations. This is accomplished preferably by the use of rubber springs of cylindrical form wherein a so called "hammocking" action is obtained. It is a further object to employ the core members of these springs as an integral frame structural member thereby permitting the use of parallel rods or tubes as main side girders.

Another object is to provide an improved swing bolster construction, resiliently supported from the main girders as aforementioned. In carrying this into effect, the bolster is preferably constructed as a U-member. The legs of the U are spread apart by a sufficient amount to contain the main side girders and are provided at their outer ends with anti-friction means. The car body rests at all times on these means and is further restrained by a resilient center pin, thus preventing any rolling motion of the car body which is not constantly cushioned.

Another object is to provide a system of springing including journal springs and frame unit separating springs and so to arrange these springs that a single system of vibration dampers bridges the journal bearings and the car body.

A still further object is to provide a two unit frame separated by springs and to support a magnetic track brake from that unit which includes the main side girders.

Other objects and advantages will become hereinafter more fully apparent as reference is had to the accompanying drawings, wherein my invention is illustrated, by way of example, and in which Figure 1 is a plan view of a rail truck showing an embodiment of my invention;

Figure 2 is a side elevation thereof;

Figure 3 is a plan view, partly in section, of a portion of the rail truck with the upper side girder member of the main frame omitted;

Figure 4 is a side elevation, partly in section, of Figure 3 with the brake mechanism omitted;

Figures 5, 6, 7, 8, 9 and 10 are cross sections respectively on the lines 5—5, 6—6, 7—7, 8—8, 9—9 and 10—10 of Figure 1;

Figure 11 is a diagrammatic elevation.

As diagrammatically illustrated in Figure 11, my truck for rail vehicles in general comprises two units, one of which is sprung from the other. The main unit comprises the main frame 1, which is resiliently supported upon two axles 2, and the sub-unit comprises the sub-frame 3, which is resiliently supported upon the main frame, and the supporting and swiveling means 4, which is supported upon the sub-frame and which in turn supports the car body 5. The main frame comprises the side girders 6 which are supported upon the journal bearings 7 by the pairs of journal springs 8 with a pair of journal springs near each end of the side girders and connected to a journal bearing. The axles 2 extend through and are journaled in these bearings. The sub-frame comprises the side girders or rails 9 and cross members 24, 25, which latter extend between and are rigidly secured to the side girders. The sub-frame is resiliently supported upon the main frame by the pairs of springs 10 which are located between the pairs of journal springs 8. The car body supporting and swiveling means comprises the swing bolster 11, the swing links 12 and the center pin 13 resiliently cushioned upon the swing bolster and connected to the car body. The swing links 12 are pivotally connected at 61 to and depend from the side girders 9 and also are pivotally connected to the swing bolster at 62. 14 are vibration dampers connected to the journal bearings 7 and the sub-frame 3.

Referring more particularly to the other figures, the side girders 6 of the main frame each comprises a pair of parallel vertically spaced upper and lower girder members 15 and 16 respectively, these girder members being in the nature of cylindrical rods or tubes. The journal springs 8 are arranged in pairs near each end of the side girders with the journal springs of each pair in advance and in rear of the associated journal bearing 7. The journal springs are located between the upper and lower girder members 15 and 16 respectively, as are also the journal bearings. Each journal spring comprises cushioning material and load transfer members, one of the latter being secured to the main side girder and another of the latter being secured to the associated journal bearing. More particularly, each journal spring comprises the concentric inner and outer masses or cylinders 17 and 18 respectively of rubber and the inner and outer metallic load transfer members 19 and 20 respectively, and the intermediate metallic load transfer member 21, the latter being located between the masses or cylinders of rubber. The inner transfer element is in the nature of a cylindrical rod or a tube which extends vertically and centrally or axially of the spring and is rigidly secured by split sleeves 19a to the upper and lower side girder members 15 and 16 and constitutes a spacer bar for the same. These split sleeves 19a clamp the girder members 15 and 16 and allow the tubes 19 to be adjusted longitudinally, thus permitting accurate alignment or realignment of the axles and exact positioning of the axles with respect to the other parts of the truck. The outer load transfer member is in the nature of a cylindrical housing which is rigidly secured to the associated journal bearing. For limiting the amount of deflection of the inner cylinder of rubber, there is the stop 22 which is rigidly secured to the inner load transfer member and which is engageable with the upper end of the intermediate load transfer member 21 upon sufficient downward movement of the inner load transfer member relative to the intermediate load transfer member. This stop, as shown, is in the nature of a depending annular metallic flange formed integral with the disk or plate 23, which is rigidly secured to the inner load transfer member. The masses or cylinders of rubber have their inner and outer surfaces effectively secured to the adjacent surfaces of the load transfer members and these masses or cylinders of rubber are also under compression, the arrangement being such that the masses or cylinders of rubber resist vertical movement caused by the load while under radial compression, and lateral movement by compression. To facilitate assembly of each spring, its inner, intermediate and outer load transfer members are each formed of a pair of cylinders which are rigidly secured together. With this construction, the main frame is resiliently supported on the journal bearings for substantial vertical movement and for restricted lateral or horizontal movement relative to the journal bearings.

The side girders 9 of the sub-frame 3 are preferably in the nature of cylindrical rods or tubes. The cross members of the sub-frame 3 each comprises the electric motor housing 24 and the cross element or bracket 25. The cross element or bracket is rigidly connected at one end to one side girder and at the other end to the motor housing and the motor housing is rigidly connected to the other side girder. As shown, the cross element or bracket and the motor housing are bolted to the vertically extending plates 26 which are rigidly secured at their upper edges as by welding to the side girders 9. The sub-frame is resiliently supported upon the main frame by the springs 10 which at each side of the sub-frame are arranged in pairs between the pairs of journal springs 8 and also between the upper and lower side girder members 15 and 16 respectively of the main frame. The springs 10 are constructed in the same manner as the journal springs 8, but are inverted, the outer load transfer members 28 being secured as by welding to the plates 29 which extend transversely of and are rigidly secured as by welding to the plates 26. The inner load transfer members 30 extend between and are rigidly secured to and form a spacer bar for the upper and lower girder members 15 and 16 respectively of the main frame. It will be seen that the sub-frame is resiliently supported on the main frame for substantial vertical movement and for restricted lateral or horizontal movement relative to the main frame.

The swing bolster 11 of the car body supporting and swivelling means is a U-member having its main portion extending laterally between the upper and lower side girder members 15 and 16 of the main frame and having at the opposite ends of its main portion the upwardly extending legs 31 which are spaced sufficiently apart to embrace the upper side girder members 15. These legs are provided at their ends with the anti-friction means which are in the nature of rolls 32 arranged in arcuate zones having their axes intersecting the axis of the center pin 13. The rolls 32 are mounted in carriers 32a carried by and isolated from the legs 31 of the bolster 11 by means of elastic rubber pads 31a, as shown in Fig. 5. The swing bolster is suspended from the sub-frame by the swing links 12 which are in the nature of plates pivotally connected to the side girders 9 of the sub-frame and depending therefrom and pivotally connected to the main portion of the swing bolster near its opposite ends by means of the gudgeons 33 which extend laterally and transversely of the main portion and are fixedly secured thereto. The swing links are preferably inclined in a downward and outward direction. The center pin 13 may be resiliently cushioned upon the cylindrical center pot 34 which is located centrally of and fixedly secured to the main portion of the swing bolster 11. This center pin is a rigid cylindrical member which extends into the pot 34 and has its upper end fixedly secured to the car body bolster 35 preferably by being welded thereto. The center pin has bearing engagement with the cylindrical guide member 36 which is located within the pot 34 and held spaced therefrom by the cylindrical cushioning element 37, which latter is preferably formed of rubber. The pot 34, the rubber element 37 and the guide member 36 preferably have closed lower ends and the guide member preferably has at its upper end the downwardly and outwardly inclined annular flange 36′ which extends over the upper ends of the rubber element 37 and pot 34 to protect the rubber element. This construction provides for limited angular movement and also limited transverse movement of the center pin relative to the pot in all directions. With this arrangement, the car body is supported and rests at all times on the antifriction means at the ends of the legs of the swing bolster, so that rolling motion of the car body is always cushioned, inasmuch as the swing bolster is cushioned upon the main frame through the sub-frame. Also, by reason of this arrangement, the swing bolster may follow the motion of the car body thereby avoiding the necessity of any free rolling motion of the car body with respect to the swing bolster.

To damp the lateral motion of the swing bolster 11 relative to the main frame 1 and the sub-frame 3, the vibration dampers 38 are provided. These dampers are in the nature of shock absorbers of standard construction, as for instance of the rotary vane type, connected to the lower end of the pot 34 and the plates 26 of the sub-frame.

The electric motors having the housings 24 are oppositely disposed and more particularly are located at diagonally opposite corners of the sub-frame. These motors are connected to the axles 2 in the same manner and therefore but one connection will be described. This connection comprises the universal joint 64 on the end of the shaft of the motor 24 and within the housings 63, the propeller shaft 39 which extends longitudinally of the truck from the universal joint 64 toward the axle near the other end of the truck, the gear member 40 operatively connected to the propeller shaft by the universal joint 41, and the gear member 42 which meshes with the gear member 40 and which is fixedly secured upon the axle. The gear members 40 and 42 are preferably hypoid gears. 43 is a housing for the gear drive and 44 is a housing for the universal joint and part of the propeller shaft. One end of the housing 44 is rigidly connected to the housing 43 and the other end terminates short of the main portion of the bolster plate 11 and is yieldably connected to the sub-frame 3 by the universal connection 45. This universal connection comprises a cross head formed of complementary upper and lower sections, each section comprising the semi-cylindrical portion 46 and the transverse semi-cylindrical portions 47 at opposite sides thereof. The semi-cylindrical portions 46 of the two sections cooperate to form a cylinder, which encircles the housing 44 near its free end. The semi-cylindrical portions 47 of the two sections cooperate to form cylindrical gudgeons which have aligned axes. 48 is a cushioning member preferably formed of a rubber strip having abutting ends, this cushioning member being located between and held under compression by the housing 44 and the encircling cylindrical portion formed by the semi-cylindrical portions 46. The pins formed by the semi-cylindrical portions 47 are resiliently supported upon the sub-frame by means of the cushioning members 49 which are also preferably formed of rubber strips and which encircle these pins and are located between the lower and upper bearing halves 50 and 51 respectively. The lower bearing halves are preferably integral parts of the brackets 52 which extend longitudinally of the truck and are rigidly secured to the associated cross element 25. The upper bearing halves are detachably secured in place by suitable means, such as the bolts 53 and the nuts 53'.

With this construction, it will be seen that the housing 44 and its connection to the sub-frame constitutes a torque resisting means for its associated axle.

The vibration dampers 14 are shock absorbers of standard construction as for instance of the rotary vane type and are located near the corners of the truck above the ends of the axles. The housings 54 of these dampers are rigidly secured to the journal bearings 7 and their arms 54' are secured by means of the links 55 to the sub-frame 3. The arrangement is such that the dampers in effect bridge the journal bearings and the car body in a dynamic sense.

56 are brakes, each brake comprising a brake drum 57 fixed upon an axle adjacent the inboard end of the housing 43 and brake shoes 58 engageable with the brake drum.

59 are magnetic track brake devices at the opposite sides of the truck and located between its wheels. These devices are of standard construction and have shoes which are engageable with the rails over which the truck wheels travel. There is one of these devices at each side of the truck and it is supported upon the main frame by means of the brackets 60 which are rigidly secured to the upper and lower side girder members 15 and 16 respectively.

What I claim as my invention is:

1. In a rail truck frame, pairs of parallel vertically spaced girder members comprising side girders, pairs of journal springs comprising elastic plastic material located between the members of each pair of said girder members, and journal bearings connected to the resilient element of each of said journal springs said resilient elements resisting all relative movements between said journal bearings and said girders.

2. In a rail truck frame, pairs of parallel vertically spaced girder members comprising side girders, journal springs located between the members of each pair of said girder members, said springs each including a spacer bar rigidly secured to each member of its pair and to a cushioning element as a load transfer means, and journal bearings connected to said cushioning elements, said journal bearings residing between the members of said pairs of girder members.

3. In a rail truck frame, pairs of parallel vertically spaced girder members comprising side girders, rubber journal springs located between the members of each pair of said girder members, said springs each comprising a mass of rubber and metallic load transfer members, one of said load transfer members constituting a spacer bar for said girder members, the other of said load transfer members being adapted for attachment to a journal bearing.

4. In a rail truck frame, pairs of parallel vertically spaced girder members, comprising side girders, pairs of rubber journal springs located between the members of each pair of girder members near each end thereof, each of said rubber springs including a cylinder of rubber, a vertical axial member through said rubber constituting a spacer bar for said girder members and being rigidly secured thereto, a cylindrical housing for said rubber secured thereto, and journal bearngs each rigidly secured to both members of a pair of said housings, said bearings residing vertically between the members of said pairs of girder members.

5. In a rail truck frame, side girders having pairs of rubber journal springs adjacent each end thereof adapted to resist vertical loading in shear, a further pair of rubber springs carried by each girder between said pairs of journal springs, and cross members connecting said side girders through the medium of said further pair of springs.

6. In a rail truck frame, pairs of parallel vertically spaced girder members comprising side girders, pairs of rubber springs located between the members of each of said pairs of girder members, each of said springs including a mass of rubber having a metallic member extending centrally therethrough and constituting a spacer bar for rigid attachment to the members of one of said pairs of girder members, and a housing for said rubber, the two springs at each end of said girder members being journal springs, the housings of the remainder of said springs being integrally secured to cross members joining said side girders.

7. In a rail truck, a frame comprising side girders and cross members, means for resiliently connecting said cross members to said side girders, and a swing bolster, said swing bolster being supported from said means whereby said swing bolster is resiliently supported from said side girders.

8. In a rail truck, a frame comprising side girders and cross members, spring means through which said cross members are connected to said side girders, means rigidly connecting said cross members, and a swing bolster hinged from the last named means.

9. In a rail truck, a frame comprising side girders and cross members, spring means through which said cross members are connected to said side girders, means rigidly connecting said cross members thereby forming a transom unit yieldingly supported on said side girders so as to be capable of movement in any direction, and a swing bolster hinged from said transom unit.

10. In a rail truck, a frame comprising side girders and cross members, spring means through which said cross members are connected to said side girders, means rigidly connecting said cross members thereby forming a transom unit yieldingly supported on said side girders so as to be capable of movement in any direction, and a swing bolster hinged from said transom unit, said swing bolster being provided with a deep socket adapted to receive the king pin from a car body thereabove.

11. In a rail truck, a frame comprising side girders and cross members, spring means through which said cross members are connected to said side girders, means rigidly connecting said cross members thereby forming a transom unit yieldingly supported on said side girders so as to be capable of movement in any direction, a swing bolster, and trunnions and trunnion bearings by which said swing bolster is supported from said transom unit.

12. In a rail truck, a main frame including main side girders, journal springs and axles, and a sub-frame including side girders, driving motors and cross members, said sub-frame being connected to said main frame through elastic spring means adapted to resist vertical loading in shear and means for supporting a car body on said sub-frame.

13. In a rail truck, a main frame including main side girders, journal springs and axles, a sub-frame including side rails, motors and cross members, and swing links hingedly connected to said side rails, said sub-frame being resiliently supported from said main side girders for substantial vertical movement and for restricted horizontal movement with respect to said main frame.

14. In combination, a rail truck comprising a main frame including side girders, journal springs and axles, a sub-frame including motors, car body supporting and swiveling means carried by said sub-frame, further springs supporting said sub-frame from said main frame, a car body resting directly on said supporting and swivelling means, and vibration dampers connected to the journals of said axles and to said sub-frame, thus bridging from said journals to said car body in a dynamic sense.

15. In combination, a car body, a rail truck frame including side girders, journals movable with respect to said side girders, journal springs supporting said side girders on said journals, and car body supporting springs between said side girders and said body, and vibration dampers which in a dynamic sense connect said journals directly with said car body.

16. In a rail truck, a frame comprising main side girders, journal bearings, journal springs between said side girders and said bearings, axles journaled in said bearings, a sub-frame including side rails and motors integrally secured to said side rails, said sub-frame being resiliently supported from said main girders, an articulated propeller shaft extending from each of said motors toward one of said axles, a gear drive operatively connecting each of said shafts with its axle, a housing for said gear drive and a torque resisting means for each of said shafts, said means being rigidly connected to said housing at one end and to a rubber universal connection with said sub-frame at its other end.

17. In combination, a rail truck including a main frame and a sub-frame, said sub-frame including truck motors and a swing bolster for supporting a car body, said body resting directly upon said swing bolster for normal vertical movement in accord with said sub-frame, said car body and said sub-frame being supported on said main frame through the medium of springs.

18. In combination, in a rail car, a car body, a rail truck comprising journal bearings, sets of journal springs for said bearings, further sets of springs between said journal springs and said body in series with said journal springs, the components of said further sets being substantially spaced longitudinally of said journal springs to constitute side springs, said springs comprising load imposing and load receiving members, and vibration damping means connecting the load imposing members of said further sets of springs and said journal bearings.

19. In a rail truck, a frame, journal bearings, journal springs for supporting said frame from said bearings, a truck swing bolster for supporting a car body with the points of connection of said car body and said bolster being in continuous contact, a support for carrying said bolster on said frame, and vibration damping means connecting said journal bearings and the support of said bolster thereby bridging between said journal bearings and said car body as to all relative vertical motions.

20. In a rail truck, a frame, journal bearings, journal springs yieldingly connecting said bearings to said frame, axles for said journal bearings, motors secured in said frame and sprung therefrom by elastic plastic elements acting in shear vertically, said motors each having an articulated propeller shaft extending toward one of said axles, a gear drive operatively connecting each of said propeller shafts with its axle, a casing for each of said gear drives, and a housing for each of said propeller shafts rigidly secured to its casing and constituting torque resisting means for said drives.

21. In a rail truck wherein a frame is resiliently supported from axles, pairs of springs supported on said frame between said axles, and driving motors supported from said pairs of springs, said springs each comprising elastic elements, said motors being supported by said elements in straight shear, said springs also carrying means for supporting a car body.

22. In a rail truck, a frame, axles, journal bearings for supporting said frame from said axles, driving motors and a plurality of springs wholly supporting said motors in said frame, each of said springs comprising a cylinder of rubber with load imposing and load receiving members concentric therewith, said load imposing members being operatively connected to said motors, said load receiving members being operatively connected to said frame, said cylinders being vertically arranged whereby the vertical loading thereon is by straight shear, said springs also carrying means for supporting a car body.

23. In a rail truck, a frame comprising side girders, axles, journal bearings for supporting said girders from said axles, driving motors diagonally disposed in said frame, means rigidly connecting said motors together, and laterally and longitudinally spaced springs comprising elastic plastic material constructed and arranged to act in shear vertically common to said motors for wholly supporting said motors in resilience from said side girders.

24. In a rail truck, a frame comprising side girders, axles, journal bearings for supporting said girders from said axles, driving motors diagonally disposed in said frame and rigidly secured together, cylinders of rubber at said side girders, and concentric load imposing and load receiving members for said cylinders of rubber constituting springs therewith and adapted to impose vertical loading on said rubber in shear, one of said members of each spring being secured to said girders, the other of said members being secured to said motors whereby said motors are supported in straight shear by said rubber.

25. In a rail truck, a truck frame, a truck bolster, cylinders of rubber at each side of said frame, concentric load imposing and load receiving members for said cylinders of rubber adapted to transmit vertical loading to and from said rubber in shear, one of said members in each case being secured to said frame, the other of said members in each case being operatively connected to said bolster whereby said bolster is supported by rubber in straight shear.

26. In a rail truck, a truck frame, including side girders, a swing bolster, vertical concentric cylindrical metallic cylinders having rubber therebetween constituting springs adapted to impose vertical loading on said rubber in straight shear, a pair of said springs for each of said side girders, the load receiving member of each spring being secured to a side girder, means for rigidly connecting the load imposing members of each spring with the load imposing member of the spring on the same side of the frame therewith, and bearings from which said swing bolster is supported by said means whereby the bolster is swingably supported from said girders in resilient shear.

27. In a rail truck, a frame comprising side girders having vertical rigid members at each end thereof, a journal bearing residing adjacent each of said vertical members, and spring means between each of said vertical members and its journal bearing, said spring means comprising a mass of rubber secured to a vertical member at one vertical surface and secured to said journal bearing at its other vertical surface whereby relative vertical motion between said journal bearing and said frame is resisted by rubber in shear.

28. In a rail truck, a frame comprising side girders having pairs of vertical members rigid therewith and located at each end thereof, journal bearings for axles residing between the members of each of said pairs of members, a mass of elastic material for each of said members secured thereto along one vertical surface thereof and secured at its other vertical surface to its journal bearing whereby relative vertical movement between each of said journal bearings and said frame is resisted by two masses of rubber in straight shear.

29. In a rail truck, a frame, journal bearings from which said frame is supported and journal springs between said frame and said bearings comprising cylindrical masses of elastic material with concentric vertical load imposing and load receiving members whereby said elastic material resists vertical loading in straight shear.

30. In a rail truck, a frame, journal bearings from which said frame is supported, and a pair of springs between each of said journal bearings and said frame, each of said springs comprising cylindrical masses of elastic material and stiff concentric load imposing and load receiving members secured to vertical surfaces thereof whereby vertical loading on said elastic material is resisted in straight shear, said bearings each being jointly carried by the load receiving members of its pair of springs.

31. In a rail truck, the combination of a frame, side springs carried by said frame for receiving loading by a car body thereabove, journal bearings, and journal springs from which said frame is supported from said journal bearings, said side springs and said journal springs comprising elastic material and load imposing and load receiving members so arranged that said elastic material in each case resists vertical loading imposed thereon in straight shear.

32. In a rail car, the combination of a truck frame, journal bearings from which said frame is supported, journal springs between said bearings and said frame, each comprising an elastic material arranged to resist vertical loading thereon in shear, and further springs between said journal springs and the body of the car in series with said journal springs each of which also includes elastic material arranged to resist vertical loading thereon in shear.

33. In a rail car, the combination of a truck frame, journal bearings from which said frame is supported, journal springs between said bearings and said frame each including a cylindrical mass of elastic material and concentric load imposing and load receiving members so arranged that said elastic material resists vertical loading in shear, and side springs carried by said frame and each including an elastic element arranged to resist vertical loading by a car body thereabove in shear.

34. In a rail car, a truck frame, journal bearings, journal springs between said bearings and said frame each including a cylindrical mass of elastic material arranged to resist vertical loading thereon in shear, and side springs carried by said frame for receiving loading by a car body thereabove, said side springs also each comprising a cylindrical mass of elastic material arranged to resist vertical loading thereon in shear.

35. In a rail truck, a truck frame, a truck bolster swingably supported by said frame, elastic means supporting said swing bolster from said frame and adapted to resist vertical loading thereon in shear and to provide resiliency in a horizontal direction, a center bearing associated with said swing bolster and forming a driving connection to the frame, and resilient means between said center bearing and said bolster for cushioning the driving connection between the bolster and a car body thereabove.

36. In a rail truck, a truck frame, a truck bolster swingably supported by said frame, elastic means supporting said swing bolster from said frame and adapted to resist vertical loading in shear and to provide resiliency in a horizontal direction, a truck center bearing member, and elastic material encircling and supporting said member on said swing bolster.

37. In a rail truck, a truck frame, a swing bolster supported by said frame, elastic means between said frame and said bolster adapted to resist vertical loading thereon in straight shear and adapted to resist relative fore and aft motion between said bolster and said frame, means for yieldingly resisting all swinging movements of said bolster, a center bearing comprising freely swivelling members one of which is adapted for attachment to a car body, and an elastic cushion for supporting the other of said members on said bolster.

38. In a rail truck, an axle, a journal bearing for said axle, a frame, and a pedestal on said frame for horizontally positioning said bearing, the legs of said pedestal being adjustably fixed to said frame whereby the position of the end of the axle may be adjusted.

39. In a railway truck, frame members, springs seated at longitudinally spaced points on said frame members, members mounted on said springs, swing hangers carried directly by said latter-mentioned members, and a bolster carried by said hangers, the bolster-supporting portions of said springs being laterally yielding and free of engagement with said frame permitting lateral movement of said latter-mentioned members to absorb lateral forces set up by the transverse jiggling of the truck frame independently of movement of said hangers and thereby prevent such forces being transmitted to the vehicle body.

40. In a railway truck, a frame having stationary seats for springs at opposite sides of the truck, springs mounted on said seats, a member extending from one of said springs to the other and carried thereby and movable transversely of the truck by yielding of said springs, swing hangers carried by said member, and a bolster carried by said hangers.

41. In a railway truck, a frame, springs seated directly on said frame at the sides of the truck, a rigid member mounted on said springs and connecting a spring at one side of the truck with a spring at the other side of the truck, the member mounting portions of said springs being yieldable horizontally of the truck with movement of said member independently of any vertical movement of said springs, devices carried independently of each other by said member at opposite sides of the truck and movable laterally of the truck on said member, and a bolster carried by said devices and movable therewith laterally of the truck relative to said member.

42. In a railway truck, a main frame, springs supported thereon, spaced frame members mounted directly on said springs, swing hangers suspended from said members and a bolster carried on said hangers, said springs yielding horizontally and vertically to provide corresponding movements of said members.

43. A rail truck comprising a truck frame and a truck bolster of substantial length extending transversely of said frame, said truck bolster being supported from said frame at each end thereof by masses of elastic plastic material acting in shear under vertical loading and in compression under all horizontal loading.

44. In a rail truck, a truck frame having swing hangers hingedly secured thereto, a swing bolster carried by said swing hangers, a center bearing comprising mating bearing members freely rotatable with respect to each other with one of said members being adapted for attachment to a car body, the other of said members being supported on said bolster by an elastic mass of material, said members also being vertically slidable with respect to each other with said elastic material being substantially free of vertical loading thereon.

45. In a rail truck, the combination of a truck frame, a center pin structure comprising freely swivelling and relatively vertically slidable members, and an elastic cushion between said structure and said frame substantially free from vertical loading and adapted to cushion all horizontal movements between a car body and the support for said cushion, one of said members being carried by a swing bolster.

46. In a railway truck, a frame having stationary seats for springs at opposite sides of the truck, springs mounted on said seats, a member extending from one of said springs to the other and carried thereby and movable transversely of the truck by yielding of said springs, swing hangers carried by said member, and a bolster carried by said hangers, said bolster having a deep socket adapted to receive a king pin.

EMIL H. PIRON.